United States Patent [19]

Schiebelhuth et al.

[11] Patent Number: 4,758,709
[45] Date of Patent: Jul. 19, 1988

[54] ELECTRIC COFFEE MAKER WITH WARMING PLATE HAVING ADJUSTABLE HEAT OUTPUT TO PREVENT OVERHEATING

[75] Inventors: Heinz Schiebelhuth, Frankfurt am Main; Boris Wonka, Neu-Isenburg, both of Fed. Rep. of Germany

[73] Assignee: Braun Aktiengesellschaft, Kronberg, Fed. Rep. of Germany

[21] Appl. No.: 805,338

[22] Filed: Dec. 5, 1985

[30] Foreign Application Priority Data

Dec. 22, 1984 [DE] Fed. Rep. of Germany ....... 3447237

[51] Int. Cl.$^4$ .................. H05B 1/02; A47J 31/00; F24H 1/10
[52] U.S. Cl. ......................... 219/283; 99/281; 99/288; 99/306; 219/297; 219/308; 219/334; 219/492; 219/511
[58] Field of Search ............. 219/308, 280, 283, 296, 219/297, 492, 493, 327, 334, 511; 99/281, 282, 288, 306–312

[56] References Cited

U.S. PATENT DOCUMENTS

| 1,943,386 | 1/1934 | Johnson | 99/281 |
| 2,025,302 | 12/1935 | Olds | 99/281 |
| 4,208,957 | 6/1980 | Bollman | 99/282 |
| 4,548,129 | 10/1985 | Van der Sluys et al. | 99/281 |

FOREIGN PATENT DOCUMENTS 1239418 4/1967 Fed. Rep. of Germany .
1429848 11/1968 Fed. Rep. of Germany .

Primary Examiner—Anthony Bartis

[57] ABSTRACT

An electric coffee maker has an electric flow-through brewing water heater with a heating resistor controlled by a temperature dependent regulating switch responsive to the temperature of the heating resistor, and a warming plate heated by the heating resistor for maintaining the prepared coffee at a desired drinking temperature. Apparatus for adjustably prolonging the interruption of heating current 2 to 5 times the normal cooling time of the regulating switch is connected in circuit with the heating resistor and the regulating switch, and a manually actuated small quantity control means connects the heating current interruption prolonging apparatus in circuit with the heating resistor and the regulating switch. The prolonging apparatus may be an adjustable auxiliary electric heater in parallel with the regulating switch and thermally coupled thereto or an adjustable timer in series with the heating resistor and regulation switch and triggered by the opening of the regulating switch.

6 Claims, 2 Drawing Sheets

MANUALLY ADJUSTABLE HEATER

ELECTRIC COFFEE MAKER WITH WARMING PLATE HAVING ADJUSTABLE HEAT OUTPUT TO PREVENT OVERHEATING

The invention relates to an electric coffee maker with an electric brewing-water heater operated by a bimetallic regulator and a warming plate for the prepared coffee heated by the heating resistor of the brewing-water heater.

Coffee makers of this type are in general use today. They contain a cold-water tank from which the water initially travels into a brewing-water heater, generally designed as a throughflow heater. The water is heated in the latter to brewing temperature and conducted via a riser tube to the filter funnel containing the ground coffee, from which the coffee then flows into a carafe located beneath. In order to prevent the coffee from cooling off during and after brewing and to keep it at the desired high drinking temperature, the carafe stands on a warming plate which is generally heated by the heating element of the brewing-water heater. In order for this heating element to properly perform its dual function of heating the water and keeping the prepared coffee warm, it is operated by a temperature-dependent regulating switch, generally a bimetallic regulator, which turns it on and off as soon as it goes above or below a predetermined maximum or minimum temperature.

The adjustment of the regulating switch required for this purpose, in earlier coffee makers, assumed that the heating of the warming plate after completion of the brewing process had to suffice, by periodic turning on and off of the heating resistor, to keep the maximum brewing capacity of that particular coffee maker warm. This meant that the prepared coffee on the warming plate of a coffee maker designed for a maximum of 10 or 12 cups for example was subjected to a constant temperature-elevating heating process even if only two or three cups for example had been prepared or the contents of the carafe had decreased to a correspondingly small amount.

Since it has been determined that certain desirable flavor components of coffee can be destroyed or at least negatively affected by constant heating, attempts have already been made to adjust coffee makers for the preparation or keeping warm of small quantities of coffee by inserting a diode in the common heating system of the brewing-water preparer and the warming plate to convert the system from full-wave operation to half wave operation. It was found, however, that this measure did not achieve the desired goal of reduced coffee heating, since practically constant heating cycles were produced which still led to overheating of small quantities of coffee.

Therefore, the goal of the present invention was to provide a simple and cost-effective way, within the scope of the coffee maker concept described above, of adjusting the heating power to specific conditions after completion of the brewing phase and to reduce it as required so that overheating of the coffee on the warming plate does not occur, especially when working with small quantities.

The invention incorporates the knowledge that an effective reduction of the heating of coffee placed on the warming plate of a coffee maker can be achieved by changing the periodic regulated behavior of the system not during the warming phase of heating, but during the cooling phase. For this purpose, the electric coffee maker according to the present invention contains electrical switching elements by means of which the duration of the heating current interruption can be prolonged beyond the period of time which would elapse until the heating circuit was closed again without the above-mentioned additional electrical circuit elements provided according to the invention.

Preferably, the invention is implemented by connecting an auxiliary heater electrically in parallel with and thermally coupled to the regulating switch, said auxiliary heater heating the regulating switch in a manner defined by its dimensioning and thermal coupling, as soon as and for as long as the regulating contacts are open.

In another advantageous embodiment of the present invention, the stated goal is achieved with the aid of a timer, an oscillator circuit, for example, whose switch contacts are connected in series with the switch contacts of the regulating switch, which timer interrupts the power supply to the coffee maker heater for a predetermined period of time, after being triggered simultaneously with the opening of the switch contacts of the regulating switch. The duration of the interruption of the heating current circuit, caused by the timer, is of course longer than the period of time according to the above definition which normally elapses until the contacts of the regulating switch close again.

Preferably, the circuit elements provided to lengthen the time until the coffee maker heater is switched on again, i.e., for example the proposed auxiliary heater or the triggerable timer, are so designed that the duration of the heating current interruption is prolonged by 2 to 5 times the normal cooling time of the regulating switch.

In another advantageous embodiment, the above circuit elements are manually adjustable to create different heating current interruption times, whereby the user of the coffee maker is given the opportunity to adjust the heating action of the warming plate to the specific quantity of coffee or the quantity usually prepared. Depending on the design, the auxiliary heater may be adjustable for this purpose or a timer may be used wherein the opening time of its switch contacts is variable.

The invention is illustrated by the attached drawing wherein.

Figure 1:
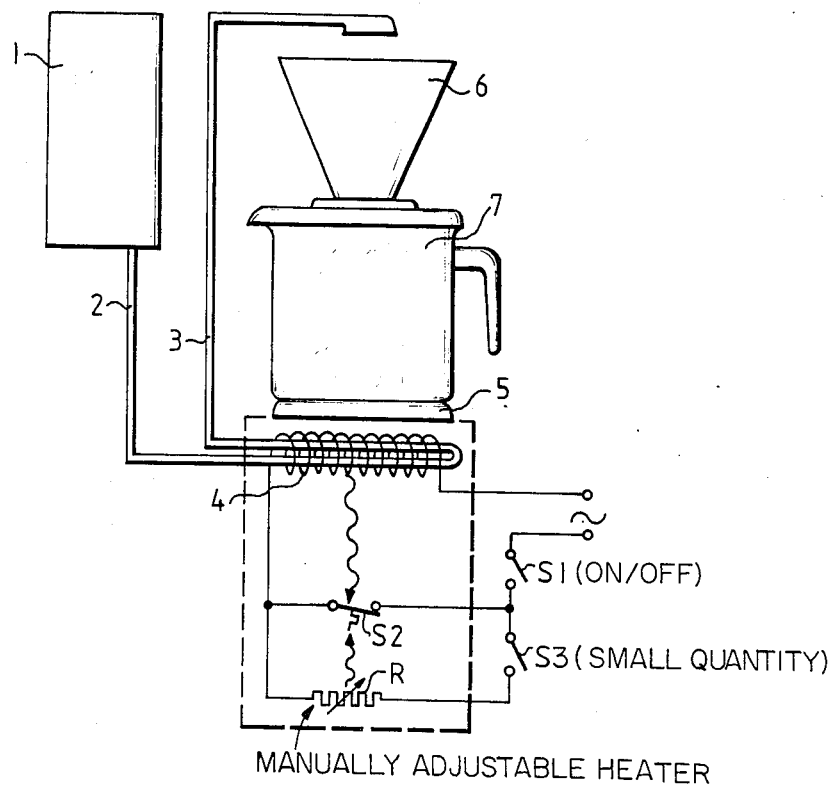
FIG. 1 shows the design principle and the electrical circuit in a preferred embodiment of the coffee maker according to the invention.

As FIG. 1 shows, a coffee maker according to the present invention contains a cold-water supply tank (1) from which the water travels through a drop tube (2) to the electrical brewing-water heater, in which it is heated by heating resistor (4) to boiling point and propelled through a riser tube (3) into filter funnel (6). In filter funnel (6) it extracts the ground coffee contained therein and the resultant coffee flows into a carafe (7) standing on a heating plate (5) heated by heating resistor (4) of the brewing-water heater. A temperature-dependent regulating switch S2 is associated in normal fashion with the brewing-water heater, said switch interrupting the heating current despite the fact that line switch S1 is closed, as soon as it is heated by the brewing-water heater to a predetermined maximum temperature T1, 145° C., for example, and which again turns on the heating current after it cools to its closing temperature T2, 130° C. for example. The duration of the heating current interruption effected in this manner by the regulating switch is a function of the system and is 1.5 minutes, for example.

An auxiliary heater R is connectable by means of small-quantity switch S3 according to the invention parallel to regulating switch S2, the ohmic resistance of said heater R being of a value such that when regulating switch S2 is closed only a negligibly small current flows through heater R. On the other hand, as soon as the regulating switch opens its contacts upon reaching its off temperature T1, auxiliary heater R is in series with heating resistor (4) in the heating circuit and because of the relatively high ohmic resistance of the auxiliary heater, for all practical purposes, the heating current can be considered to be interrupted. In this situation, auxiliary heater R heats up regulating switch S2 in such fashion that its switch contacts close again only with a considerable time delay. The magnitude of this time delay can be affected by dimensioning auxiliary heater R and its thermal coupling to regulating switch S2. Obviously, this time delay creates a situation in which heating plate (5) and the coffee standing on it are heated only at longer intervals, resulting in a lower heating of the coffee.

Figure 2:
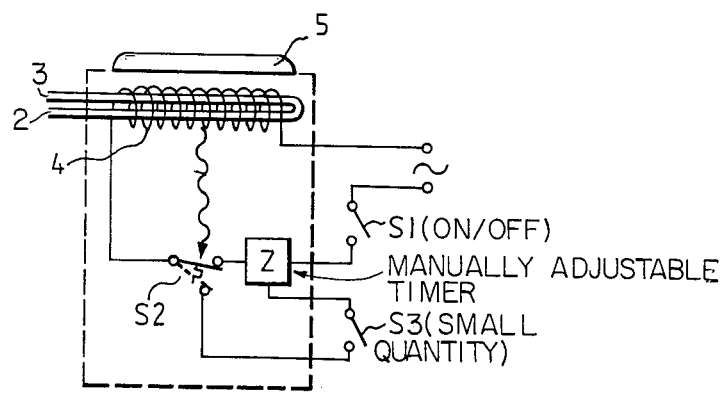
FIG. 2 is the circuit part in another advantageous embodiment.

The circuit in FIG. 2 produces the same result: Here a timer Z is added to the heating current circuit in series with regulating switch S2. As soon as regulating switch S2 reaches its response temperature T1, it interrupts the heating circuit as usual, whereby it switches to the position shown by the dotted lines in FIG. 2, and triggers timer Z via a trigger lead and closed small-quantity switch S3 so that the latter interrupts the circuit for a predetermined time interval, which is, for example, three times the normal period of time that elapses between the opening of the regulating switch at temperature T1 and its closing again at temperature T2. In this manner, therefore, a considerable prolongation, for example, by a factor of 3, of the heating current interruption is achieved as well.

Figure 3A:
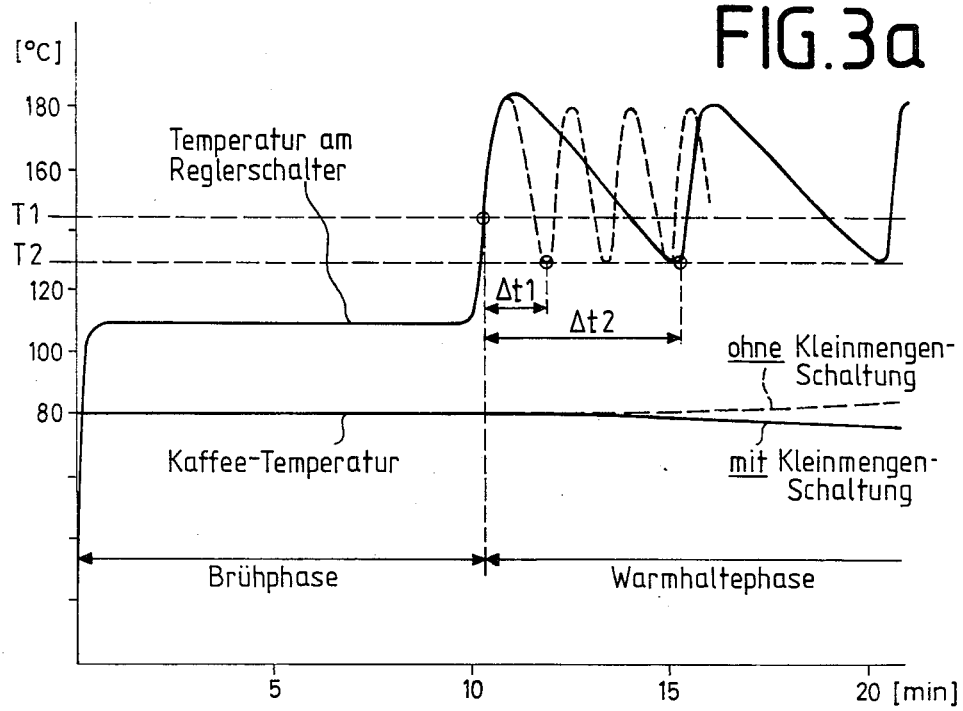
FIG. 3a shows a curve of temperature as a function of time during "brewing phase" and "warming phase" intervals.
Figure 3B:
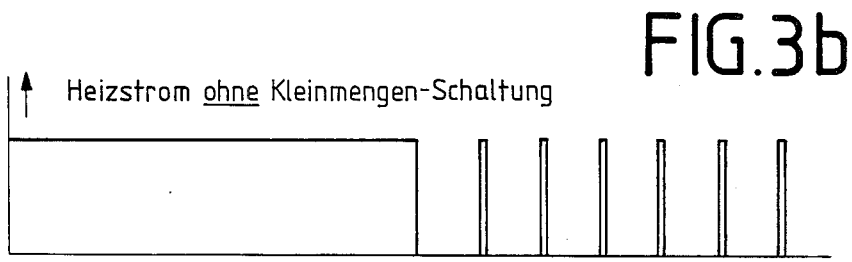
FIG. 3b shows a graph of heating current without a small quantity circuit according to the invention.
Figure 3C:
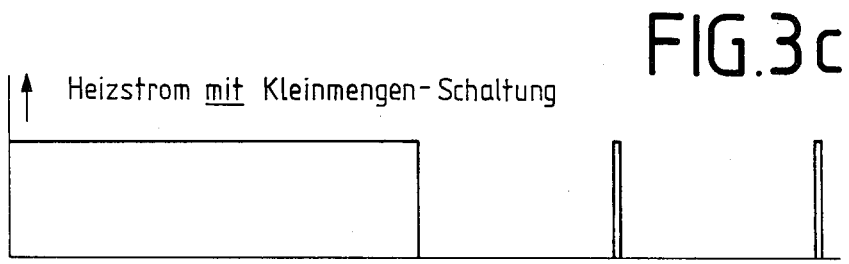
FIG. 3c shows a graph of heating current with a small quantity circuit according to the invention.
Figure 3A:
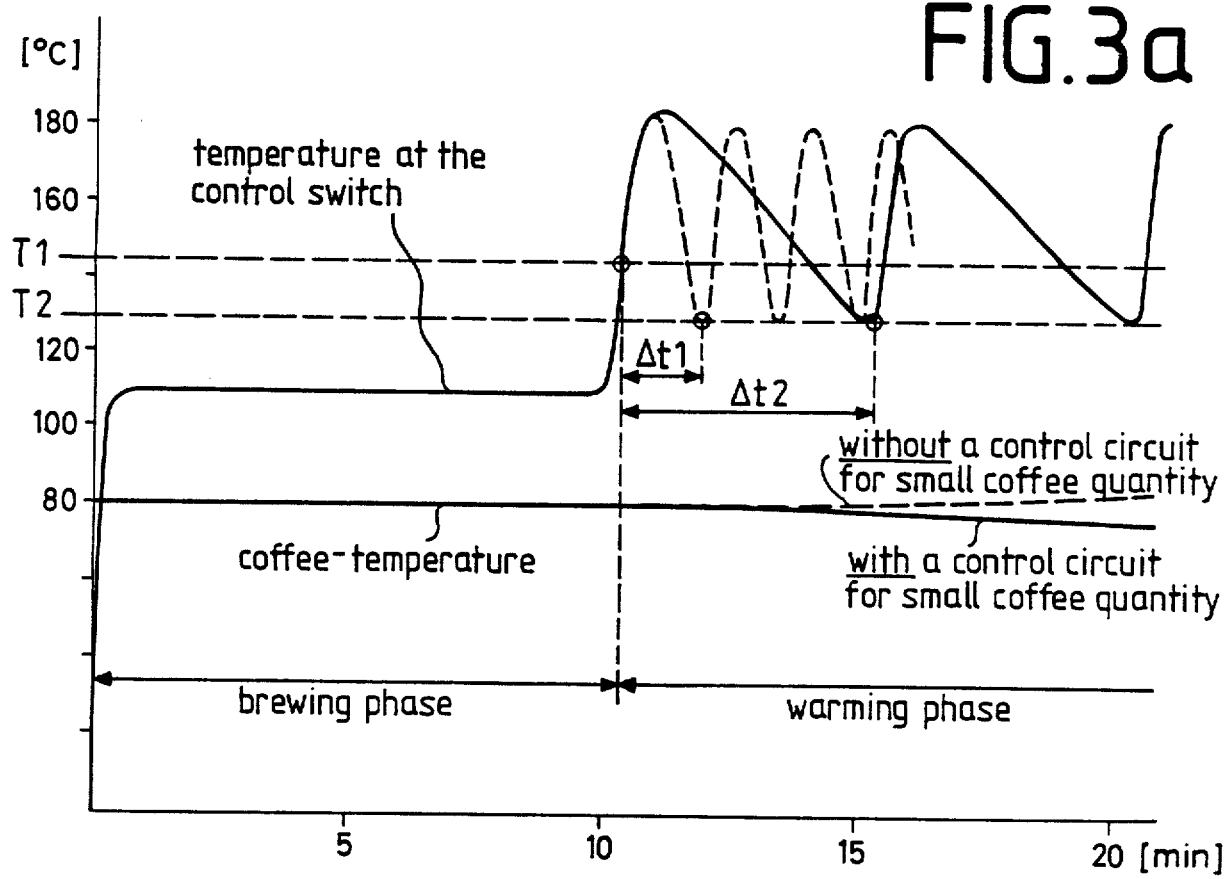
Figure 3B:
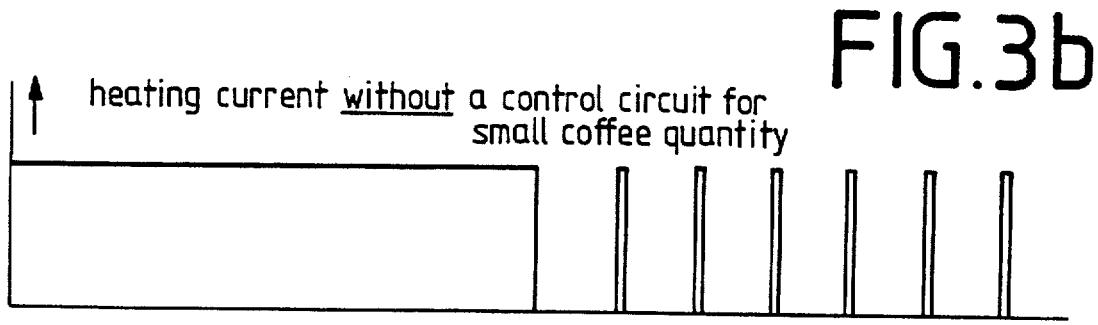
Figure 3C:
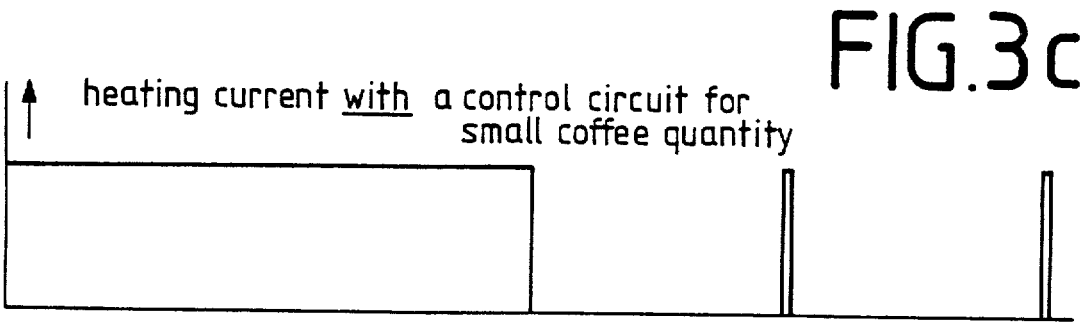

FIGS. 3a–3c illustrate the effect which can be achieved by the invention, as produced, for example, by the circuit shown in FIG. 1. As FIG. 3a shows, the regulating switch initially warms up during the brewing phase to a temperature of 110° C., for example. As soon as all the water has boiled away, the regulating switch temperature rises steeply, reaching shutoff temperature T1. Then the regulator switch temperature without auxiliary heater R according to the invention or with small-quantity switch S3 open, follows the curve shown by the dashed lines in FIG. 3a; in other words after a brief transition caused by the thermal inertia of the system, after time interval ΔT1, it reaches the temperature T2 at which the regulating switch closes again and the next heating cycle begins. Therefore, all in all, we have the pattern of the heating current shown in FIG. 3b with the result that the temperature of a small quantity of coffee placed on the warming plate of the coffee maker, as indicated by the corresponding curve in FIG. 3a, slowly rises starting at about 80° C. for example.

With the small-quantity switch according to the invention on the other hand, the temperature of the regulating switch after reaching shut-off temperature T1 follows the curve shown in FIG. 3a. As a result of heating by auxiliary heater R, regulating switch S2 cools off much more slowly, so that it does not reach the temperature T2 at which it closes again until after a much longer time interval ΔT2 has elapsed. This is followed again by a short heating time and a prolonged cooling phase as described above. The heating current therefore follows the curve shown in FIG. 3c with the result that the coffee temperature during the warming phase no longer rises, but is either at an approximately constant level or slightly dropping.

The same result, i.e., the heating current curve shown in FIG. 3c and the coffee temperature which remains constant over time or decreases slightly, even with small quantities of coffee as shown in FIG. 3a, is advantageously accomplished with the circuit shown in FIG. 2.

The present invention thus produces a possibility which is simple from the design and circuit engineering standpoint and is extremely inexpensive, for achieving a warming operation for small quantities of coffee in coffee makers of the type described herein, in which there is no overheating and consequently no adverse effects on the flavor of the coffee. In addition to this result, by means of which the goal which forms the basis of the invention is achieved, the present invention with circuit elements R and Z also basically provides a way of carrying out a subsequent adjustment or modification of the regulating behavior of regulating switch S2 in simple fashion. This gives the advantage from the manufacturing standpoint of using a single heating system for coffee makers of very different sizes.

What is claimed is:

1. In an electric coffee maker provided with an electric flow-through brewing water heater having a heating resistor controlled via a cyclically openable and closeable temperature dependent regulating switch responsive to heat flow from said heating resistor, said regulating switch being adapted to interrupt heating current flow to said heating resistor after said regulating switch has reached a first predetermined temperature until said regulating switch has cooled down to a second predetermined temperature, thus defining an interruption time period, and a warming plate heated by said heating resistor of said brewing water heater for maintaing the prepared coffee at a desired drinking temperature, the improvement comprising, apparatus for prolonging the interruption of heating current after the opening of said regulating switch in response to heat flow from said heating resistor beyond the normal interruption time period of said regulating switch and adapted to be selectively connected in circuit with said heating resistor and said regulating switch, and manually activated small quantity control means for selectively connecting said heating current interruption prolonging apparatus in circuit with said heating resistor and said regulating switch when it is desired to maintain a small quantity of prepared coffee at a desired temperature by means of said warming plate.

2. In an electric coffee maker according to claim 1 wherein said prolonging apparatus comprises an auxiliary electric heater which is thermally coupled to said temperature dependent regulating switch and is connected electrically in parallel with said regulating switch, said small quantity control means comprises a manually operable switch in series with the auxiliary heater, said regulating switch being heatable as a function of the dimensioning and thermal coupling between said auxiliary heater and said regulating switch only when said regulating switch is open and the switch comprised within said small quantity control means is closed.

3. In an electric coffee maker according to claim 1 wherein said prolonging apparatus comprises a timer having a triggering circuit and normally closed switch contacts in series with said regulating switch and said heating resistor, said normally closed switch contacts being opened in response to the triggering of said triggering circuit by the opening of the switch contacts of said regulating switch, said timer maintaining the contacts thereof open for a predetermined time period longer than the time required for said regulating switch to reclose, said small quantity control means comprising a manually actuated switch in series with the triggering circuit of said timer for selectively rendering said triggering circuit operative in response to the opening of the regulating switch, and said small quantity control means being connected in series with the triggering circuit of said timer when said regulating switch is open.

4. In an electric coffee maker according to one of claims 1 to 3, wherein said prolonging apparatus is designed for prolonging the duration of the heating current interruption by a factor of two to five times the normal cooling times of said regulating switch.

5. In an electric coffee maker according to claim 4, wherein said prolonging apparatus is manually adjustable to produce different heating current interruption times.

6. In an electric coffee maker according to one of claims 1 to 3, wherein said prolonging apparatus is manually adjustable to produce different heating current interruption times.

* * * * *

UNITED STATES PATENT AND TRADEMARK OFFICE
CERTIFICATE OF CORRECTION

PATENT NO.   :   4,758,709
DATED        :   July 19, 1988
INVENTOR(S)  :   Heinz Schiebelhuth, et al.

It is certified that error appears in the above-identified patent and that said Letters Patent are hereby corrected as shown below:

The attached sheet of drawings (Figures 3A-3C) should be substituted for the corresponding drawing sheet in the issued patent, as the substitute sheet has legends in English.

Signed and Sealed this

Seventh Day of March, 1989

Attest:

DONALD J. QUIGG

Attesting Officer

Commissioner of Patents and Trademarks